(12) United States Patent
Chang et al.

(10) Patent No.: US 6,812,282 B2
(45) Date of Patent: Nov. 2, 2004

(54) THERMOPLASTIC COMPOSITIONS PROVIDING MATT SURFACE

(75) Inventors: Moh-Ching Oliver Chang, Wexford, PA (US); Yin-Shen Chang, Erlanger, KY (US)

(73) Assignee: Bayer Polymers LLC, Pittsburgh, PA (US)

(*) Notice: Subject to any disclaimer, the term of this patent is extended or adjusted under 35 U.S.C. 154(b) by 141 days.

(21) Appl. No.: 10/241,598

(22) Filed: Sep. 10, 2002

(65) Prior Publication Data

US 2004/0048980 A1 Mar. 11, 2004

(51) Int. Cl.$^7$ .............................................. C08G 63/48
(52) U.S. Cl. ............................ 525/64; 525/66; 525/70; 525/73; 525/77; 525/80; 525/85
(58) Field of Search .............................. 525/66, 70, 73, 525/77, 85

(56) References Cited

U.S. PATENT DOCUMENTS

| | | | |
|---|---|---|---|
| 4,460,742 A | 7/1984 | Kishida et al. | 525/64 |
| 4,894,416 A | 1/1990 | Gallucci | 525/74 |
| 5,475,053 A | 12/1995 | Niessner et al. | 525/64 |
| 5,580,924 A | 12/1996 | Wildi et al. | 526/65 |
| 5,990,239 A | 11/1999 | Chang et al. | 525/85 |
| 6,395,828 B1 | 5/2002 | Chang et al. | 525/65 |

FOREIGN PATENT DOCUMENTS

| | | |
|---|---|---|
| EP | 0 884 361 A1 | 12/1998 |
| WO | 99/33914 | 7/1999 |

*Primary Examiner*—Jeffrey C. Mullis
(74) *Attorney, Agent, or Firm*—Joseph C. Gil; Aron Preis

(57) ABSTRACT

A low gloss thermoplastic composition suitable for making article having low gloss and a process for its preparation are disclosed. The composition contains (I) a resinous component that includes (a) a (co)polyalkyl (meth)acrylate rubber characterized that it contains no grafted phase, (b) a poly(vinyl aromatic-co-nitrile)-grafted (co)polyalkyl (meth)acrylate rubber, and (c) a poly(vinylaromatic-co-nitrile), and (II) a gloss-reducing agent that is the reaction product of (d) a compound having two or more maleic anhydride groups per molecule, and (e) a compound having two or more terminal primary amine groups per molecule, with the proviso that the total of the maleic anhydride groups per molecule and the terminal primary amine functional groups per molecule is greater than 4. The incorporation of the gloss reducing agent in the inventive composition may be by blending the reaction product or, in the alternative, by blending the reactants (d) and (e) in the molten resinous component under process conditions designed to bring about the in situ formation of the inventive gloss reducing agent.

20 Claims, No Drawings

THERMOPLASTIC COMPOSITIONS PROVIDING MATT SURFACE

FIELD OF THE INVENTION

The present invention relates to a thermoplastic composition that contains grafted acrylate rubber and more particularly to compositions suitable for making molded articles having a non-glossy surface.

SUMMARY OF THE INVENTION

A low gloss thermoplastic composition suitable for making articles having low gloss and a process for its preparation are disclosed. The composition contains a resinous component that includes (a) a (co)polyalkyl (meth)acrylate rubber characterized in that it contains no grafted phase, (b) a poly(vinyl aromatic-co-nitrile)-grafted (co)polyalkyl (meth) acrylate rubber, and (c) a poly(vinylaromatic-co-nitrile), and a gloss-reducing agent that is the reaction product of (d) a compound having two or more maleic anhydride groups per molecule, and (e) a compound having two or more terminal primary amine groups per molecule, with the proviso that the total of the maleic anhydride groups per molecule and the terminal primary amine functional groups per molecule is greater than 4. The incorporation of the gloss reducing agent in the inventive composition may be by blending the reaction product or, in the alternative, by blending the reactants (d) and (e) in the molten resinous component under process conditions designed to bring about the in situ formation of the inventive gloss reducing agent.

BACKGROUND OF THE INVENTION

Products prepared of thermoplastic molding compositions are often times glossy, yet for some applications this is not a desirable property.

There is considerable need for low-gloss compositions especially in applications such as computer housings, keyboards, appliances and automotive parts.

Acrylonitrile-styrene-acrylate interpolymers (hereinafter referred to as "ASA resins") are well known in the art, and have many favorable features such as good strength and outstanding weathering resistance. Attempts to reduce the high gloss of these resins met with the disadvantages as discussed below.

Elimination of gloss by surface embossing has been practiced but requires a separate step and adds cost. Moreover, subsequent abrasion may remove the embossed matte surface and cause the gloss to reappear. Addition of a finely-divided filler, such as silica, silicate or aluminate or other similarly inert minerals has been demonstrated to reduce the gloss of thermoplastic molding compositions yet this is often accompanied by an undesirable reduction in the level of at least some physical and/or mechanical properties of the molded article, most notably the impact strength. In addition to the adverse effect on the impact strength, there is often a corresponding decline of the heat distortion temperature, decline in the weld line strength, deficient weathering and light stability, as well as other important properties.

U.S. Pat. No. 4,460,742 disclosed a delustered thermoplastic resin composition containing a thermoplastic resin, such as acrylic resin, and a component that contains the crosslinked polymerization product of a $C_{1-4}$ alkyl methacrylate and a copolymer of aromatic vinyl and $C_{1-13}$-alkyl acrylate.

U.S. Pat. No. 4,894,416 disclosed a low gloss thermoplastic blend with good physical properties that contains a core-shell ASA (acrylate-styrene-acrylonitrile interpolymer) resin blended with a polymer of glycidyl (meth)acrylate.

U.S. Pat. No. 5,580,924 disclosed reduced gloss thermoplastic compositions entailing compounding a styrene-acrylonitrile copolymer (SAN) in the presence of an electrophilic reagent and an acid to form a gel, and then compounding the resultant gels with polycarbonate, SAN and ABS graft polymer to form a PC/ABS/SAN composition having reduced gloss.

U.S. Pat. No. 5,990,239 disclosed a low gloss thermoplastic blend that contains an ASA resin blended with a polyalkyl acrylate rubber containing no grafted phase.

DETAILED DESCRIPTION OF THE INVENTION

The inventive thermoplastic composition comprises
(I) a resinous component that includes:
 (a) An ungrafted (co)polyalkyl (meth)acrylate rubber, preferably polybutyl (meth)acrylate rubber, which may optionally be crosslinked,
 (b) A grafted rubber, which may optionally be crosslinked, containing a substrate of polyalkyl (meth)acrylate, preferably polybutyl (meth)acrylate and a phase grafted thereto (herein grafted phase) where the substrate may be homopolymeric or copolymeric and where the grafted phase contains poly(vinyl aromatc-co-nitrile), preferably styrene-acrylonitrile (SAN), and
 (c) A poly(vinyl aromatic-co-nitrile), preferably styrene-acrylonitrile (SAN) having a weight-average molecular weight of about 50,000 to 200,000, preferably 80,000 to 150,000 g/mole, and
(II) a gloss-reducing agent that is the reaction product of:
 (d) A compound having two or more maleic anhydride groups per molecule, and
 (e) A compound having two or more terminal primary amine groups per molecule.

In a preferred embodiment, the inventive composition is further characterized in that the contents of (co)polyalkyl (methacrylate rubber is 10 to 40, preferably 15 to 35%, relative to the weight of the resinous component. In a yet further preferred embodiment, Components (a) and (b) relate by weight such that the ratio between (a) to the total of (a)+(b) is 0.1 to 0.8, preferably 0.15 to 0.7. In a still further preferred embodiment the particle size of the acrylate rubber (weight average particle size) is 0.02 to 10 microns, preferably 0.03 to 1 microns.

The ungrafted rubber, (a) of the resinous component, is (co)polyalkyl (meth)acrylate rubber, which may optionally be crosslinked, is the polymerized product of known (co) monomers, including $C_1$–$C_{18}$-alkyl acrylate and $C_1$–$C_6$-alkyl methacrylate, preferably, $C_2$–$C_8$-alkyl acrylate and $C_1$–$C_4$-alkyl methacrylate with or without additional comonomers. Most preferred are poly(n-butyl acrylate), poly(ethyl acrylate) and poly(2-ethyl hexylacrylate). Optionally, the rubber may contain small amounts, of about 1 to 20% by weight relative to the weight of the (met) acrylate monomer of additional monomers such as styrene, (meth)-acrylonitrile, methylmethacrylate,(meth)acrylic acid, vinylidene chloride, vinyl toluene or other ethylenically unsaturated comonomers which may be copolymerizable with the (meth)acrylate monomer.

Crosslinking as an optional characteristic of the rubber useful in the present context results in the substantial insolubility of the rubber in such solvents as tetrahydrofuran, methyl ethyl ketone, cyclohexanone or acetone. The degree of crosslinking imparted to the rubber is that which results from the incorporation therewith of about 0.1 to 2.0 parts by weight (pbw) of crosslinking agent per hundred parts by weight of rubber (pphr); preferably the crosslinking agent is present in an amount of 0.4 to 1.4 pphr. Crosslinking of the copolymer substrate may be attained during the polymerization of the rubber by including in the reaction, a crosslinking agent, for instance, di- or poly-functional ethylenically unsaturated monomer. Among the suitable crosslinking agents mention may be made of divinyl benzene, trimethylol propane triacrylate, allyl methacrylate, diallyl fumerate, diallyl maleate, 1,3-butylene dimethacrylate, diethylene glycol dimethacrylate, ethylene glycol dimethacrylate, trimethylol propane trimethacrylate, methylene bisacrylamide, diethylene glycol diacrylate, ethylene glycol diacrylate, divinyl ether, diallyl phthalate, divinyl sulfone, divinyl sorbitol, triethylene glycol dimethacrylate, trimethylene glycol diacrylate, butylene glycol diacrylate, octylene glycol diacrylate, trimethylolpropane triacrylate, tetraacrylate ester of pentaerythritol, ethylidene norbornene, vinyl norbornene, diallyl phosphonate, triallyl cyanurate and triallyl isocyanurate. The preferred crosslinking agent is diallyl maleate (DAM).

The ungrafted polyalkyl acrylate rubber has a weight average particle size of 0.02 to 10 microns, preferably 0.03 to 1 microns.

The grafted rubber, (b) of the resinous component, contains an optionally crosslinked substrate of (co)polyalkyl (meth)acrylate and a phase grafted thereto (herein "grafted phase"). The substrate may be homopolymeric or copolymeric and the grafted phase may comprise poly(vinyl aromatic-co-nitrile), preferably styrene-acrylonitrile (SAN).

The substrate is identical in all respects to the component (a) of the ASA resin described above and is, like (a), optionally crosslinked. The grafted phase which is optionally crosslinked, comprises poly(vinyl aromatic-co-nitrile), preferably styrene-acrylonitrile copolymer (SAN). The grafted phase preferably contains about 20 to 40 percent of a nitrile copolymer (such as acrylonitrile, herein referred to as "AN") and 80 to 60 percent of a vinyl aromatic comonomer (such as styrene, herein referred to as "S"). The preferred relative amounts are 25 to 35 percent of the former and 65 to 75 percent of the latter, the percents being in relations to the weight of the grafted phase. Optionally, the grafted phase may include minor amounts, less than 20 percent by weight relative to the weight of this phase, of at least one member selected from the group of additional monomers such as substituted chlorobenzene, styrene (t-butyl styrene, á-methyl styrene), ethylenically unsaturated compounds (methyl methacrylate, alkyl acrylate, vinylidene chloride maleic anhydride, N-substituted maleimide) ethylene, propylene and isobutylene.

The molecular weight of the grafted phase may optionally be controlled by the use of conventional chain transfer agents. Suitable chain transfer agents include tert-dodecyl mercaptan, n-dodecyl mercaptan, terpenes, terpinolenes and chlorinated hydrocarbons.

The grafted phase may optionally be crosslinked. Crosslinking is attained by means similar to the ones discussed above in respect to the substrate. The amount of crosslinking agent that may be incorporated in the grafted phase is about 0.05 to 0.5, preferably 0.1 to 0.3 pphr of grafted phase.

The preferred composition of the grafted phase is SAN copolymer which contains 28 percent of AN and 72 percent of styrene. Crosslinking may be attained by the introduction of DAM.

The weight ratio between the grafted phase to substrate In component (b) is in the range of about 25 to 150 pbw of grafted phase per 100 pbw of substrate.

The grafted copolymer rubber has a weight average particle size of 0.02 to 10 microns, preferably 0.03 to 1 microns.

The grafted copolymer rubber of the present invention is prepared by any of the methods which are well known to those skilled in the art. Preferably, these are prepared by polymerizing the styrene and acrylonitrile monomers in the presence of the rubber, by emulsion, suspension bulk or mass polymerization methods.

A portion of the vinyl aromatic and unsaturated nitrile monomers polymerized in the presence of the rubber substrate used to prepare the grafted copolymer rubber of the present invention will not be grafted to the rubber substrate but will be present as ungrafted polymer, such as polystyrene-acrylonitrile (SAN). The amount of such ungrafted SAN polymer depends upon the weight ratio of monomers to rubber, the nature of the rubber and the conditions of polymerization. This ungrafted portion, preferably SAN, has a number-average molecular weight of about 20,000 to 100,000, preferably 25,000 to 75,000 g/mole.

Component (c) is an ungrafted, uncrosslinked poly(vinyl aromatic-co-nitrile), preferably styrene-acrylonitrile. This component is characterized in that it contains about 20 to 40 percent of structural units derived from a nitrile comonomer, preferably acrylonitrile and 80 to 60 percent of the aromatic vinyl comonomer, preferably styrene; the preferred amounts are 25 to 35 percent of the nitrile comonomer and 65 to 75 percent of the. aromatic vinyl comonomer, the percents being in relations to the weight of the poly(vinyl aromatic-co-nitrile). Optionally, this phase may include minor amounts, less than 20 percent by weight relative to the weight of this phase, of additional monomers such as substituted styrene (t-butyl styrene, chlorobenzene, alpha-methyl styrene) or ethylenically unsaturated compounds such as methyl methacrylate, alkyl acrylate, vinylidene chloride, ethylene, propylene, isobutylene, maleic anhydride, N-substituted maleimide or mixtures of any of the above. The preferred composition of the uncrosslinked component (c) contains 32 percent of AN and 68 percent of styrene. The copolymer is also characterized in that it has a weight-average molecular weight of about 50,000 to 200,000, preferably 70,000 to 160,000 g/mole.

Preferably the resinous component of the inventive composition, the combination of (a), (b) and (c) is present in the composition in an amount of at least 80% and less than 99%, preferably 82 to 98%, most preferably 85 to 95% and the gloss reducing agent is present in an amount greater than 1% and up to 20%, preferably 2 to 18%, most preferably 5 to 15%, the percents being relative to the weight of the composition (total weight of resinous component and gloss reducing agent).

It has been found that such composition provides substantial reduction in gloss while retaining desirable physical properties such as impact strength, tensile strength as well as good thermal properties.

The gloss reducing agent of the present invention is the reaction product of:
(d) a compound having two or more maleic anhydride groups per molecule with
(e) a compound having two or more terminal primary amine groups per molecule (average amine functionality greater than 1.8 per molecule).

The gloss reducing agent may be incorporated in the composition as the pre-formed reaction product of (d) and (e) or introduced into the ASA melt as individual reactants in their pre-reacted form. In this later case the reaction product is formed under the thermal condition in the course of melt blending, such as in the course of extrusion to form the inventive low gloss composition.

The maleic anhydride compound suitable in the context of the invention is a compound (optionally an oligomeric compound) having a weight-average molecular weight of at least 4000 g/mole, that contains at least 2 maleic anhydride functional groups per molecule and includes in its molecular structure elements derived from (i) at least one vinyl monomer that contains no maleic anhydride functionality and (ii) at least one maleic anhydride functional group.

The preferred molecular weight (weight-average molecular weight) of the suitable maleic anhydride compound is 50,000 to about 200,000, most preferably 80,000 to 150,000 g/mole. The compound contains at least 2 maleic anhydride functional groups per molecule, preferably 2 to 400, most preferably 5 to 300 maleic anhydride functional groups.

Among the suitable vinyl monomers that are free of maleic anhydride functionality mentioned may be made of ethylene, propylene, styrene, acrylonitrile, (meth)acrylic acid ester, and vinyl acetate.

The preferred maleic anhydride compounds are styrene-methyl methacrylate-maleic anhydride and styrene-maleic anhydride copolymers.

The suitable amine compound contains polyolefinic or polyether structural units, and at least two terminal primary amine functional groups per molecule. The preferred structure contains at least one of polyethylene, polypropylene and polyether structural units, and the most preferred contains structural units of polypropylene oxide. The number-average molecular weight of the suitable amine compound is generally, 300 to 18,000, preferably 400 to 15,000, most preferably 700 to 10,000 and the compound contains at least 2 (average amine functionality greater than 1.8), preferably 2 to 5, most preferably 3 to 4 terminal primary amine functional groups per molecule. Most preferred amine compound is polypropylene oxide having a molecular weight of 4000 to 6000 and containing 3 terminal primary amine functional groups per molecule.

Importantly, the total number of the maleic anhydride groups of the maleic anhydride compound and the terminal primary amine functional groups of the amine compound is greater than 4.

The preparation of the gloss reducing agent by reacting (d) with (e) is conventional and may be carried out by procedures and means that are well known to the art-skilled.

The gloss reducing agent may also be incorporated in the inventive composition as the pre-reacted components (d) and (e). In this embodiment of the invention the maleic anhydride compound and the amine compounds are blended together with the ASA resin in sufficient amounts to result, under the thermoplastic processing conditions, in the formation of the reaction product.

An effective amount of the gloss reducing agent is generally in the range of more than 1 and up to 20%, preferably 2 to 18%, most preferably 5 to 15% relative to the weight of the composition (the total weight of the resinous component and gloss reducing agent). Lesser amounts give inadequate gloss reduction, greater amounts are excessively costly and may adversely affect physical properties of the blend or molded articles made therefrom.

The inventive composition may be modified by the addition of additives for their art-recognized function. Such additives include fillers (such as clay or talc), reinforcing agents (such as glass fibers), impact modifiers, other resins, plasticizers, flow promoters and other processing aids, stabilizers, colorants, mold release agents, flame retardants, ultraviolet screening agents, and the like.

The preparation of the inventive composition may be carried out by blending the resinous component with the pre-prepared reaction product or, in the alternative, with the pre-reacted reactants that react in the course of the thermoplastic processing of the composition to form the gloss reducing agent. The blending, in either embodiment of the invention may be carried out by conventional means and following procedures that are well known to the art-skilled. Blending or kneading may be carried out by machines such as a Banbury mixer or an extruder, or in the alternative by solvent blending. The sequence of addition is not critical but the components should be thoroughly blended together and under time and temperature conditions conducive for the reaction to be completed.

The invention will be better understood with reference to the following examples, which are presented for purposes of illustration rather than for limitation, and which set forth the best mode contemplated for carrying out the invention.

EXAMPLES

Compositions demonstrating the invention were prepared and their properties were determined. The terms used in the following description re defined as follows:

Melt Temperature—the direct measurement (using an IR-meter) of the surface temperature of the extruded sheet upon its emergence from the die.
Extrusion Pressure—on-line pressure measurement near the end of the extruder barrel;
MFI—the melt flow index, in g/10 min. determined according to ASTM D1238, under load of 10 kg at 230° C.;
Viscosity—a Kayeness capillary rheometer was used to evaluate the viscosity at 100 1/s, 220° C. in accordance with ASTM D3835;

Gloss (at 85°) was measured at room temperature in accordance with the procedure set forth in ASTM D523 using a Gardner gloss meter on the extruded sheet, measurements were in both perpendicular and parallel orientations to the flow direction.

In carrying out the following examples, the compositions contained in addition to the indicated components small amounts of the following conventional additives that are believed to have no criticality to the invention: antioxidants. UV light absorbers, a plasticizer, a flowing aid a lubricant and a pigment.

The preparation of the compositions that are described below followed conventional procedures. U.S. Pat. 5,990,239 that disclosed the preparation of low gloss compositions containing ASA resin blended with a poly-alkylacrylate rubber that contains no grafted phase is incorporated herein by reference.

The following notations appearing in the tables are described as follows:

A-1: SAN-grafted crosslinked poly(butyl acrylate-acrylonitrile) rubber; the rubber having monomodal particle size distribution, with average particle size of 0.15 microns. The weight ratio of the rubber to the grafted SAN was 100:60. The weight ratio of the styrene to acrylonitrile was about 70/30. A-1 contained about 12% SAN (the acrylonitrile content of the SAN was 23% and its molecular weight (number average) was 47,000 gm/mole). The rubber level of A-1 was about 55%.

A-2: Is a blend of two varieties of an SAN-grafted butyl acrylate rubber having bimodal particle size distributions of 0.4 and 0.15 microns. The core/shell structure of the rubbers (styrene core and crosslinked poly(butyl acrylate shell) is believed to be immaterial to the present findings. The weight ratio of the rubber to the grafted SAN was about 100:80. The weight ratio of the styrene to acrylonitrile was about 70/30. The rubber content is about 55% by weight.

A-3: A blend of SAN-grafted acrylate rubber (The weight ratio of the rubber to the grafted SAN was about 100:60), 44%; ungrafted acrylate rubber, 27.5%; and SAN, 28.5% (23% AN, number average molecular weight of 47,000 g/mole). The particle size of the rubber was 0.15 microns with rubber level of 55%. (the rubber in both the grafted portion (a), and the ungrafted portion (b) was butyl acrylate with 6% by weight of acrylonitrile).

The compositional makeup of A-1, A-2 and A-3 are shown in Table 1 below:

TABLE 1

| Component | A-1 | A-2 | A-3 |
|---|---|---|---|
| Ungrafted polyacrylate rubber | 0.0% | 0.0% | 27.5% |
| SAN-grafted polyacrylate rubber | 88.0% | 100.0% | 44.0% |
| SAN | 12.0% | 0.0% | 28.5% |

The exemplified compositions presented below each contained 45.5% of the indicated "A" component (from Table 1) and 54.5% of SAN, the percents being relative to the total weight of the exemplified composition. The weight average molecular weight and acrylonitrile content of the SAN were 120,000 g/mole and 32%, respectively. The rubber content of each of the compositions shown in Table 2 was 25% by weight.

TABLE 2

| Resinous component | R-1 | R-2 | R-3 |
|---|---|---|---|
| Ungrafted polyacrylate rubber | 0.0% | 0.0% | 13% |
| SAN-grafted polyacrylate rubber | 40% | 46% | 20% |
| SAN | 60% | 55% | 67% |

The components of the gloss reducing agent used in the exemplified compositions are present in the indicated amounts, expressed as parts by weight per one hundred parts of resinous component (pphr).

The maleic anhydride compound was a styrene/methyl methacrylate/maleic anhydride copolymer (the components relate by weight one to the others as 68/7/25) having a number average molecular weight of 60,000 g/mole, and about 150 maleic anhydride functional groups per molecule.

The amine compound was a primary poly(propylene oxide) triamine having approximate molecular weight of 5000 g/mole.

The compounding of the compositions and the extrusion of test specimens were carried out following the procedures summarized below.

| Compounding | |
|---|---|
| | American Leistritz 30-mm twin-screw extruder |
| Melt Temperature: | Set at: 190 increased to 230 degree C. for Zone-1 to 10 (die) |
| Screw Speed: | 250 rpm |

| Extrusion | |
|---|---|
| Extruder: | Killion 1" extruder with the 6" adjustable die |
| Melt Temperature: | Set at: 380 degree F. for all zones and die |
| Screw Speed: | Set at: 100 rpm |
| Take-off Speed: | 2.0 cm/second |

The dimension of the extruded strip is 8.5 cm wide and 50 mil thick. All the specimens were conditioned at 23° C. and 50% relative humidity for at least 48 hours before physical testing.

TABLE 3

| | 1(C) | 2(C) | 3(C) | 4(C) | 5 |
|---|---|---|---|---|---|
| Resinous component | R-1 | R-3 | R-1 | R-2 | R-8 |
| Maleic anhydride compound pphr | 0 | 0 | 5 | 5 | 5 |
| Amine compound pph | 0 | 0 | 8 | 8 | 8 |
| Melt temperature of extrusion ° F. | 432 | 421 | 434 | 430 | 427 |
| Extrusion pressure (psi) | 2075 | 1730 | 2795 | 2925 | 2680 |
| MFI | 14.1 | 14.9 | 3.5 | 1.1 | 3.7 |
| Viscosity, (Pa · s) | 1230 | 1342 | 1894 | 2262 | 1826 |
| Gloss, perpendicular | 82 | 46 | 18 | 35 | 15 |
| Gloss, parallel | 92 | 53 | 17 | 37 | 14 |

(C) — denotes a comparative example.

The results shown in Table 3 clearly show that the gloss reducing agent is effective in reducing the gloss In accordance with the invention, Example 5 where the resinous component contains component (a), (b) and (c). The comparative examples wherein the resinous components contained either component (a) alone (comparative example 1 and 3) and comparative example 4 wherein the resinous component contained none of component (b) showed but a modest reduction in gloss.

Example-2

In an additional set of examples, compositions as described below were prepared and their properties determined.

TABLE 4

| | 6(c) | 7 |
|---|---|---|
| Resinous components | R-2 | R-3 |
| Maleic anhydride compound pph | 5 | 5 |
| Amine compound pph | 4 | 4 |
| Melt temperature of extrusion ° F. | 432 | 427 |
| Extrusion pressure (psi) | 2855 | 2395 |
| MFI | 0.4 | 5.1 |
| Viscosity (Pa · s) | 2351 | 1711 |
| Gloss, perpendicular | 43 | 39 |
| Gloss, parallel | 48 | 37 |

(C) — denotes a comparative example.

The results point to the efficacy of the gloss reducing agent in the context of the resinous component termed R-3 and to its relative inefficiency in R-2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (I) a resinous component that contains
      (a) a (co)polyalkyl (meth)acrylate rubber characterized that it contains no grafted phase,
      (b) a poly(vinyl aromatic-co-nitrile)-grafted (co)polyalkyl (meth)acrylate rubber, and
      (c) a poly(vinylaromatic-co-nitrile), and
   (II) a gloss-reducing agent that is the reaction product of
      (d) a compound having two or more maleic anhydride groups per molecule, and
      (e) a compound having two or more terminal primary amine groups per molecule, with the proviso that the total of the maleic anhydride groups per molecule and the terminal primary amine functional groups per molecule is greater than 4.

2. The composition of claim 1 wherein (co)polyalkyl (meth)acrylate rubber is present in the composition in an amount of 10 to 40% relative to the weight of the composition.

3. The composition of claim 2 wherein (co)polyalkyl (meth)acrylate rubber is present in the composition in an amount of 15 to 35%.

4. The composition of claim 1 wherein the amounts of (a) and (b) relate by weight such that the ratio between (a) to the total of (a)+(b) is 0.1 to 0.8.

5. The composition of claim 1 wherein the amounts of (a) and (b) relate by weight such that the ratio between (a) to the total of (a)+(b) is 0.15 to 0.7.

6. The composition of claim 1 wherein the particle size of the a (co)polyalkyl (meth)acrylate rubber (weight average particle size) is 0.02 to 10 microns.

7. The composition of claim 1 wherein the particle size of the a (co)polyalkyl (meth)acrylate rubber (weight average particle size) is 0.03 to 1 microns.

8. The composition of claim 1 wherein (a) is crosslinked.

9. The composition of claim 1 wherein (a) contains (co)polymerized $C_1$–$C_{18}$-alkyl acrylate.

10. The composition of claim 1 wherein (a) contains (co)polymerized $C_1$–$C_6$-alkyl methacrylate.

11. The composition of claim 1 wherein (a) is a member selected from the group consisting of poly(n-butyl acrylate), poly(ethyl acrylate) and poly(2-ethyl hexylacrylate).

12. The composition of claim 9 wherein (a) further contains 1 to 20% by weight relative to the weight of (a) of at least one (co)polymerized unit derived from the group consisting of styrene, (meth)-acrylonitrile, methylmethacrylate,(meth)acrylic acid, vinylidene chloride and vinyl toluene.

13. The composition of claim 10 wherein (a) further contains 1 to 20% by weight relative to the weight of (a) of at least one (co)polymerized unit derived from the group consisting of styrene, (meth)-acrylonitrile, methylmethacrylate, (meth)acrylic acid, vinylidene chloride and vinyl toluene.

14. The thermoplastic molding composition of claim 1 wherein the a poly(vinyl aromatic-co-nitrile)-grafted (co)polyalkyl (meth)acrylate rubber is crosslinked.

15. The thermoplastic molding composition of claim 14 wherein the a poly(vinyl aromatic-co-nitrile)-grafted (co)polyalkyl (meth)acrylate rubber contains a substrate of polyalkyl(meth)acrylate.

16. The thermoplastic molding composition of claim 15 wherein the substrate is copolymeric.

17. The thermoplastic molding composition of claim 15 wherein the substrate is homopolymeric.

18. The thermoplastic molding composition of claim 14 wherein the poly(vinyl aromatic-co-nitrile) is styrene-acrylonitrile copolymer.

19. The thermoplastic molding composition of claim 1 wherein (c) is styrene-acrylonitrile having a weight average molecular weight of 50,000 to 200,000 gm/mole.

20. The thermoplastic molding composition of claim 1 wherein resinous component (I) is present in an amount of 80 to less than 99 percent relative to the weight of the composition.

* * * * *